United States Patent Office 3,402,221
Patented Sept. 17, 1968

3,402,221
POLY(α-OLEFINS) CONTAINING SULFATED OR SULFONATED CONDENSATION POLYMERS
John R. Caldwell, Kingsport, Tenn., assignor to Eastman Kodak Company, Rochester, N.Y., a corporation of New Jersey
No Drawing. Filed Oct. 29, 1963, Ser. No. 319,699
12 Claims. (Cl. 260—897)

ABSTRACT OF THE DISCLOSURE

Dyeable polyolefin fiber- and film-forming compositions susceptible of permanent dyeing by basic dyes containing a dye receptor, a polyether condensation polymer containing in its molecule from 0.4 to 6 percent of sulfur in the form of an acidic group selected from the class consisting of sulfonic acid and acid sulfate groups.

---

This invention relates to dyeable poly-α-olefin compositions adapted for formation into fibers, filaments, films and other shaped objects which are susceptible of permanent dyeing by basic dyes.

It is well known that various polyolefins, particularly polypropylene in the partially or completely crystallized form, can be employed in the production of fibers, filaments, films and other shaped objects which will have valuable properties such as high strength and elongation, resistance to the action of chemicals such as acids, alkalies, and various other agents. However, because high molecular weight fiber-forming crystalline polyolefins are relatively insoluble and water resistant, as well as being chemically inert, several serious problems arise in the dyeing and processing of textile fibers and filaments produced therefrom. Polypropylene fibers, for example, cannot be dyed to any appreciable extent by conventional dyeing procedures in which dyes are applied from aqueous solutions or suspensions, because of polypropylene's exceptionally high resistance to wetting by aqueous media. Since polypropyllene is also relatively chemically inert, fibers produced from it cannot be dyed even by the use of hydrocarbon-soluble dye stuffs which might be expected to give satisfactory results. Similarly, polypropylene fibers cannot be permanently dyed by surface chemical action, as is possible with many other synthetic fiber-forming materials, even with the aid of a dye carrier such as butyl benzoate, o-phenylphenol or chlorinated benzenes. In fact, the inability to dye polypropylene and similar poly-α-olefin fibers has been the most serious obstacle to the practical use and commercial acceptance of these otherwise excellent fibers.

Attempts have been made to overcome the above-mentioned difficulties by incorporating in the polyolefin material certain additives which are themselves susceptible of taking up a dyestuff or reacting with it chemically, but it has been found that many of the more promising materials suggested for this purpose are inadequate and impractical because in many cases they are, not only extremely difficult to incorporate in polypropylene and other poly-α-olefin fiber-forming compositions, but also adversely affect physical properties of fibers spun from such compositions. In some cases the additives tend to exude and give the fibers a sticky hand or other undesirable properties which preclude satisfactory processing on textile machinery such as pickers, cards and the like. It has been proposed in certain disclosures of the prior art to incorporate various vinyl type polymers such as poly(vinyl acetate) or poly(butyral) into polymeric α-olefins in order to improve the dyeing properties thereof. An example of such a disclosure is that of French Patent No. 1,190,703. While additives such as therein suggested impart affinity for disperse dyes, since such additives do not contain any strongly acidic groups, they cannot impart any practical affinity for basic dyes.

It is accordingly the principal object of this invention to overcome the above-mentioned difficulties and to provide a practical and satisfactory poly-α-olefin fiber- and film-forming composition which can be satisfactorily dyed with basic dyes.

Another object is to provide polypropylene compositions adapted to be formed into fibers, filaments, films and other shaped objects which will be susceptible of permanent dyeing by basic dyes.

Another object is to provide crystalline or partially crystalline polypropylene fibers, filaments and yarns susceptible of being dyed by basic dyes to shades which are gas fast, light fast and wash fast and show no tendency to crock or bleed.

A further object is to provide polypropylene and other poly-α-olefin fibers, filaments and yarns susceptible of permanent dyeing with basic dyes and readily processible on pickers, cards, looms, spinning and knitting machines and other textile machinery.

Other objects will appear hereinafter.

These objects are accomplished by the following invention which, according to one embodiment thereof, comprises uniformly dispersing in or blending with crystalline or partially crystalline polypropylene or other poly-α-olefin or a copolymer thereof, a condensation polymer containing an acid sulfate or sulfonic acid group in its molecule. The sulfated or sulfonated condensation polymers employed in accordance with my invention are those derived from the condensation polymers selected from the group consisting of polyesters, polyamides, polyureas, polyurethanes, polyethers and polyamide-esters. These are all well-known classes of condensation polymers and the preparation thereof is specifically illustrated in detail in the examples forming a part of this specification.

For the purposes of the present invention the condensation polymers may be defined as polymeric materials composed of linear chains of monomeric units derived from at least one bifunctional compound having its two functional substituents selected from the group consisting of carboxy, oxy, amino and isocyanato substituents, said monomeric units being linked end to end in linear chains by means of linkages selected from the group consisting of ester, amide, urethane, urea and ether linkages. The particular condensation polymers used in practicing the present invention contain sulfonic acid or acid sulfate groups attached to one or more of the various types of monomeric units enumerated above. Condensation polymers containing sulfonic or acid sulfate groups are well known in the art and their structure and preparation are described in the following patents: Belgian 596,144 and 596,145, Japanese 11,443 (1962), U.S. 3,018,272, 3,077,-492, 3,077,493 and 3,057,827.

The condensation polymers employed in accordance with the process of my invention should contain from 0.4 percent to 6 percent and preferably from 0.8 percent to 3 percent of combined sulfur in the form of sulfonic acid or acid sulfate groups. As is well known to those skilled in the art to which this invention relates, this sulfur content can be obtained in a wide variety of polymers and copolymers employing many types of sulfur containing monomers.

The preferred poly-α-olefins susceptible of being given an affinity for basic dyes in accordance with my invention are those that can be crystallized. The prepartion and characteristics of such polymers are described by Natta in Makromolecular Chemie 16, 213 (1955), and Angew. Chem., 68, 393 (1956); J. Poly. Science, 21, 547 (1956), and in Skinners' Silk and Rayon Record, 30, No. 4, 134 (1956). Examples of suitable poly(α-olefins) include polyethylene, polypropylene, polystyrene, poly(allylbenzene), poly(allylcyclohexane), poly(vinylcyclohexane), poly(allylcyclopentane), poly(4-methyl-pentene-1), etc.

The scope of the present invention includes all types of monomers having the chain structures described above which are stable under the temperature and other conditions customarily employed for processing the polyolefin polymer to which they are added into fibers, films and other shaped objects, as for example, by melt spinning, extruding, molding and the like.

As indicated above and in accordance with my invention, from 1–25 percent by weight and preferably 5–15 percent, based on the weight of the total composition, of the sulfur-containing condensation monomer is incorporated in the poly-α-olefin polymers. There are numerous ways of incorporating or blending the polymer additive with the polyolefin material. One method of obtaining a suitable blend or dispersion is to slurry the powdered poly-α-olefin in a liquid dispersion or solution of the condensation polymer, as for example, a 5 percent solution of the sodium salt of sulfonated polyamide in water. The slurry is then evaporated to dryness, leaving the condensation polymer mixed with or coating the particles of the polyolefin material. The resultant powdered product can then be melt spun or extruded into fibers or filaments or into films and other shaped objects which will have a uniform dispersion of the condensation polymer in the polyolefin material and will dye readily with basic dyes.

Another method of incorporating the condensation polymer in the poly-α-olefin polymer is to mill the two materials on hot rolls or in a suitable hot mixer. The condensation polymer is added as a solution, a dispersion, or in powdered form to the polymer material as it is being milled on the hot rolls and while it is in a fluid state. The polymer containing the dispersed condensation polymer can then be extruded into fibers, films or other products which can be permanently and satisfactorily dyed with basic dyes.

In still another method for obtaining a mixture or blend of the poly-α-olefin and condensation polymer, the condensation polymer is dissolved or suspended in a hot solution of the polyolefin polymer. In this case a solvent is employed which will dissolve the polyolefin polymer when hot, but which is a nonsolvent for the polymer when cold. When the hot mixture of the two polymers is cooled, the polyolefin polymer crystallizes from solution and carries with it the condensation polymer in a finely-dispersed form. The polyolefin precipitates, the crystals of which are thus coated or associated with the vinyl polymer, is then filtered and dried. The dry product may then be extruded into fibers or films which, on drafting and crystallizing, can be readily dyed with basic dyes. Alternatively, the hot mixture of dissolved polyolefin and suspended sulfur-containing condensation polymer can be converted into films, fibers and other shaped objects by evaporation of the solvent.

The sulfur-containing condensation polymers can also be used in conjunction with another type of polymeric modifier in the polyolefin structure. Thus, for example, the sulfur-containing condensation polymer and a polyamide may both be dispersed in the polyolefin polymer by any of the methods described above. Other suitable polymeric modifiers that may be used in combination with the sulfur-containing condensation polymers include polyesters, poly(vinyl butyral), cellulose derivatives and vinyl polymers that do not contain sulfonic acid or acid sulfate groups.

In the following examples and description I have set forth several of the preferred embodiments of my invention but they are included merely for purposes of illustration and not as a limitation thereof.

POLYESTERS CONTAINING ACID SULFATE OR SULFONIC ACID GROUPS

Example I

Thirty g. of the dibutyl ester of 5-sulfoisophthalic acid lithium salt, 50 g. of dimethyl isophthalate and 120 g. of 1,4-cyclohexanedimethanol were placed in a flask equipped with a stirrer, a distillaton column and an inlet for purified nitrogen. Titanium tetrabutoxide (0.1 g.) was added as catalyst. The mixture was stirred at 200–220° under nitrogen while butyl and methyl alcohols were removed by distillation through the column. The temperature was then raised to 260° and stirring was continued for 30 minutes. A vacuum of 0.1 mm. was applied and the excess glycol was removed. The melt increased in viscosity and stirring was continued for 10–15 minutes to give a short-chain polyester. The product was a brittle glass. It was ground to a particle size of 200-mesh.

(A) Five g. of the polyester sulfonate and 95 g. of crystallizable polypropylene were mixed in a heated Banbury mixer in an atmosphere of nitrogen. The blend was extruded as a ⅛″ rod which was cut into ⅛″ pellets. The pellets were extruded through a multihole spinneret by the melt-spinning process. The fibers were drafted 400–600 percent and were heat-set.

The fibers dyed well with basic dyes to medium and dark shades. Dyeing assistants or swelling agents can be used but are not necessary.

(B) Ten g. of the polyester sulfonate and 90 g. of poly(4-methylpentene-1) were blended as described in A above. Fibers spun from the mixture dyed well with basic dyes. Drafted films also dyed well with basic dyes.

(C) Six g. of the polyester sulfonate was dissolved in 100 cc. of alcohol and the solution was stirred with 94 g. of 200-mesh polystyrene powder (crystalline type polystyrene). The slurry was heated and stirred while the water was evaporated. A coating of sodium polyester sulfonate was formed on the surface of the polystyrene particles. The coated particles were melt-spun to give fibers that dyed well with basic dyes.

(D) Eight g. of the polyester sulfonate and 92 g. of poly(allylbenzene) were mixed by the slurry method as described in C above. Fibers made from the blend dyed well with basic dyes.

Example II

A polyester was made from 0.5 mole adipic acid, 0.5 mole sodium sulfosuccinic acid and 1.0 mole of 2,2-dimethyl-1,3-propanediol. The polymer was soluble in water.

(A) Ten g. of the polymer was dissolved in 100 cc. of water and the solution was stirred with 90 g. of polyethylene powder while the water was evaporated. The treated polyethylene was then extruded as fibers. The fibers dyed well with basic dyes.

(B) Five g. of the sulfosuccinic acid polyester was dissolved in 150 cc. of water and the solution was stirred with 95 g. of crystallizable polypropylene powder while the water was evaporated. The blend was extruded and the fibers dyed well with basic dyes.

Example III

Four molecular proportions of 1,4-cyclohexanedimethanol and three molecular proportions of sebacic acid were heated at 200–220°, with a trace of titanium butoxide catalyst, until the acid number was less than 2.0. The resulting short-chain polyester was dissolved in dioxane and two molecular proportions of o-sulfobenzoic acid anhydride were added. The solution was then heated at 70–80° for 6 hours, using a trace of pyridine as catalyst. The anhydride reacted with the terminal hydroxyl groups on the polyester to form ester groups and thus attach benzenesulfonic acid groups to the polymer chain:

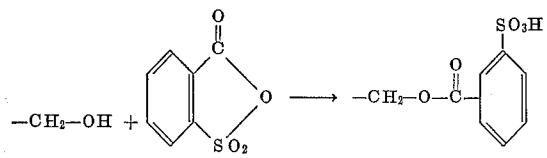

The sulfonic acid groups were neutralized with sodium carbonate.

(A) Eight g. of the sulfonated polymer was mixed with 92 g. of crystallizable polypropylene and the blend was converted into fibers. The fibers dyed well with basic dyes.

(B) Poly(vinylcyclohexane) fibers containing 12 percent of the sulfonated polymer dyed well with basic dyes.

(C) Crystalline poly(4-methylpentene-1) fibers containing 6 percent of the polymer dyed well with basic dyes.

(D) Crystalline polystyrene fibers containing 10 percent of the polymer dyed well with basic dyes.

Example IV

One molecular proportion of trimethylolpropane, one molecular proportion of 2,2-dimethyl-1,3-propanediol and 2 molecular proportions of azelaic acid were heated and stirred in a nitrogen atmosphere at 180–220° until the acid number was less than 8. A polyester containing free hydroxyl groups was obtained. The product was dissolved in ethylene dichloride and was treated with sulfur trioxide at $-10°$ to form the acid sulfate of the hydroxyl groups. The sulfated polyester was neutralized with sodium carbonate. It was isolated as a fine powder by spray-drying.

(A) Crystallizable polypropylene fibers containing 25 percent of the sulfated polyester dyed well with basic dyes.

(B) Crystallizable poly(allylcyclohexane) fibers containing 10 percent of the sulfated polyester dyed well with basic dyes.

POLYAMIDES CONTAINING ACID SULFATE OR SULFONIC ACID GROUPS

Example V

One molecular proportion of 5-sulfoisophthalic acid sodium salt, 1 molecular proportion of sebacic acid and 2.1 molecular proportions of 3,3'-(ethylenedioxy)bis(propylamine) were placed in a flask equipped with a stirrer, a distillation column and an inlet for purified nitrogen. Water was added to form a clear solution and the mixture was heated and stirred. The temperature was raised to 120–130° during 30 minutes and water began to distill through the column. The temperature was then raised to 200° C. and held for 45 minutes. The column was then removed, nitrogen was passed over the melt and stirring was continued while the temperature was raised to 250° during 30 minutes and held at this temperature for 20 minutes. The melt was then cooled under nitrogen. The polymer was ground to a particle size of 200-mesh.

(A) Ten g. of the sulfonated polyamide and 90 g. of crystallizable polypropylene were mixed in a Banbury mixer in a nitrogen atmosphere. Fibers spun from the blend dyed well with basic dyes and the color showed good fastness toward light, dry cleaning and laundering. The fibers also dyed well with premetallized dyes.

(B) A copolyamide was made from 0.75 mole caprolactam, 0.25 mole adipic acid and 0.25 mole hexamethylenediamine. Eight g. of the caprolactam copolyamide and 8 g. of the sulfonated polyamide were mixed with 84 g. of crystallizable polypropylene in a Banbury mixer. Fibers spun from the blend dyed well with basic dyes and prematallized dyes.

(C) Ten g. of the sulfonated polyamide and 90 g. of crystallizable polystyrene (as 200-mesh powder) were thoroughly blended and the mixture was extruded as film. The film was drafted 200 percent and heat-set. It dyed well with basic dyes.

(D) Eight g. of the sulfonated polyamide was blended with 92 g. of poly(allylbenzene) and the mixture was extruded to form a monofil. The monofil dyed well with basic dyes and premetallized dyes.

Example VI

Twenty-one and 0.8 g. of 3,3'-(2,2-dimethyltrimethylenedioxy)bis(propylamine) and 15.04 g. of azelaic acid were heated and stirred in a nitrogen atmosphere at 180° for 30 minutes, then at 230° for 2 hours. A short-chain polyamide was formed that contained a ratio of 5 moles diamine and 4 moles of dicarboxylic acid groups.

The polymer was dissolved in 350 g. of dimethylformamide and 8.8 g. of o-sulfobenzoic anhydride was added to the solution. The mixture was then heated at 100° for 3 hours with stirring. The anhydride reacted with the terminal amino groups in the polymer to form amide groups and thus attach benzenesulfonic acid groups to the polymer chain:

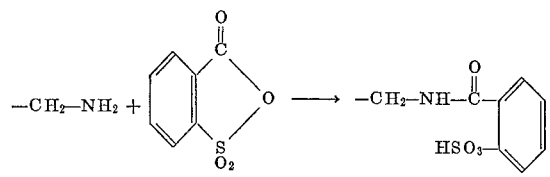

The sulfonic acid groups were neutralized with sodium carbonate.

(A) One hundred g. of the dimethylformamide solution of the sulfonated polyamide was stirred with 88 g. of crystallizable polypropylene powder and the solvent was evaporated in vacuum at 80–100°. This treatment deposited approximately 12 g. of sulfonated polyamide on the polypropylene. Fibers spun from the blend dyed well with basic dyes and prematallized dyes.

(B) Poly(allylcyclohexane) fibers containing 15 percent of the sulfonated polyamide dyed well with basic dyes.

Example VII

Ten and 0.94 g. of 3,3'-(2,2-dimethyltrimethylenedioxy)bis(propylamine), 7.52 g. of azelaic acid and 5.2 g. of m-sulfobenzoic acid sodium salt were placed in a flask. Enough water was added to form a clear solution and the solution was stirred and heated at 140°. When most of the water was distilled off, the temperature was raised to 230° and stirring was continued for 3 hours. The product was cooled under nitrogen. It was a brittle, opaque solid.

The polymer contained a ratio of 5 moles diamine, 4 moles azelaic acid and 2 moles of m-sulfobenzoic acid. The polymer chains were terminated by the sulfobenzoic acid groups.

(A) Polypropylene fibers containing 15 percent of the sulfonated polyamide dyed well with basic dyes.

(B) Polystyrene fibers containing 20 percent of the sulfonated polyamide dyed well with basic dyes.

Example VIII

A copolyamide was made from 0.2 mole of caprolactam, 0.05 mole of 5-sulfoisophthalic acid monopotassium salt and 0.05 mole of 3,3'-(ethylenedioxy)bis(propylamine).

(A) Ten parts of the sulfonated polyamide and 90 parts of crystallizable polypropylene were blended and extruded as fibers. The fibers dyed well with basic dyes.

(B) Crystallizable polystyrene films containing 15 percent of the sulfonated polyamide dyed well with basic dyes.

(C) Polyethylene fibers containing 25 percent of the sulfonated polyamide dyed well with basic dyes.

POLYUREAS CONTAINING ACID SULFATE OR SULFONIC ACID GROUPS

Example IX

One molecular proportion of benzidine-3-sulfonic acid sodium salt and one molecular proportion of 3,3'-(1,4-butylenedioxy)bis(propylamine) were dissolved in dimethylformamide to give a 10–15 percent solution. Two molecular proportions of 2,4-tolylenediisocyanate was slowly added with stirring and a temperature of 40–50° was maintained by cooling. A polyurea containing sodium sulfonate groups was produced. The polyurea was precipitated by pouring the solution into acetone.

(A) Polypropylene fibers containing 8 percent of the sulfonated polyurea dyed well with basic dyes and premetallized dyes.

(B) Polystyrene fibers containing 10 percent of the sulfonated polyurea dyed well with basic dyes and premetallized dyes.

(C) Fibers made from poly(allylcyclohexane) and containing 10 percent of the sulfonated polyurea dyed well with basic dyes.

Example X

Two molecular proportions of lithium sulfanilate, two molecular proportions of 1,3-propanediamine and three molecular proportions of decamethylenediisocyanate were reacted to give a short-chain polyurea terminated with lithium sulfonate salt groups.

(A) Polyethylene fibers and films containing 15 percent of the sulfonated polyurea dyed well with basic dyes.

(B) Polyethylene fibers and films containing 20 percent of the sulfonated polyurea dyed well with basic dyes.

POLYURETHANES CONTAINING SULFATE OR SULFONIC ACID GROUPS

Example XI

One molecular proportion of the diethyl ester of 4-sulfo-2,4'-methylenedibenzoic acid sodium salt was heated with 2 molecular proportions of decamethylene glycol, using titanium butoxide as ester-interchange catalyst. The mixture was stirred at 220–240° until approximately 2 moles of ethyl alcohol were removed by distillation. The product was then dissolved in dimethylformamide to give a 15–20 percent solution and 1 molecular proportion of 2,4-tolylenediisocyanate was added. The solution was then heated and stirred at 100–120° for 2 hours. A poly(ester-urethane) containing sodium sulfonate groups was obtained. The polymer was precipitated in acetone.

(A) Ten g. of the sulfonated poly(ester-urethane) was mixed with 90 g. of crystallizable polypropylene powder and the blend was extruded to make fibers that dyed well with basic and premetallized dyes.

(B) Polystyrene fibers containing 6 percent of the sulfonated poly(ester-urethane) dyed well with basic dyes and premetallized dyes.

(C) Films of polyethylene containing 12 percent of the sulfonated poly(ester-urethane) dyed well with basic dyes.

Example XII

Three molecular proportions of 1,4-cyclohexanedimethanol was dissolved in dimethylformamide to give a 10–15 percent solution and 4 molecular proportions of 2,4-tolylenediisocyanate was added. The mixture was heated at 70–80° for 2 hours to produce a shortchain polyurethane terminated with isocyanate groups. A 10 percent solution of 2 molecular proportions of 4-(2-hydroxyethoxy)lithium benzenesulfonate in dimethylformamide was then added and the mixture was heated at 70–80° for 3 hours. The isocyanate groups on the polymer chains reacted with the hydroxyl groups of the 4-(2-hydroxyethoxy)lithium benzenesulfonate and the polymer thus became terminated with lithium benzenesulfonate groups:

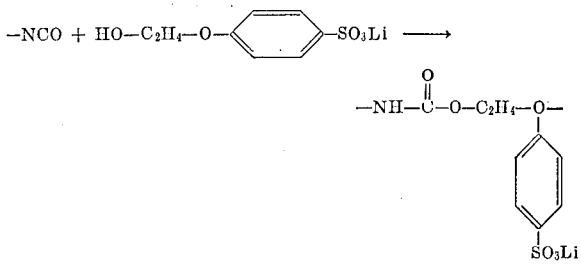

The sulfonated polyurethane was isolated by precipitation in acetone.

(A) Polypropylene fibers containing 20 percent of the sulfonated polyurethane dyed well with basic dyes.

(B) Polystyrene fibers containing 15 percent of the sulfonated polyurethane dyed well with basic dyes.

Example XIII

Three molecular proportions of butylene glycol and one molecular proportion of 4-sulfophthalic acid anhydride sodium salt were heated at 170–185° until the acid number was less than 10. The product was mixed with twice its weight of dimethylformamide and two molecular proportions of hexamethylenediisocyanate were added. The mixture was stirred at 50–60° for two hours. The poly(ester-urethane) was isolated by pouring the reaction mixture into acetone.

(A) Crystallizable polypropylene fibers containing 12 percent of the poly(ester-urethane) sulfonate dyed well with basic dyes.

(B) Polyethylene fibers and films containing 15 percent of the poly(ester-urethane)sulfonate dyed to heavy shades with basic dyes.

POLYETHERS CONTAINING ACID SULFATE OR SULFONIC ACID GROUPS

Example XIV

A polyether having a moleculer weight of 3500–4000 was made from dicholorodiethey ether and 2,2-di(4-hydroxyphenyl)propane as described in U.S. Patent No. 2,060,715 to Du Pont. The polymer was dissolved in ethylene dichloride and was treated with sulfur trioxide in order to introduce sulfonic acid groups into 40–50 percent of the benzene rings. The product was converted to the potassium salt with potassium hydroxide. It was ball-milled to a particle size of 200–300 mesh.

(A) Polypropylene fibers containing 4 percent of the sulfonated polyether dyed well with basic dyes.

(B) Polystyrene fibers containing 6 percent of the sulfonated polyether dyed well with basic dyes.

Example XV

A polyether containing free hydroxyl groups was made by known processes from Bisphenol A and epichlorohydrin. The polymer was dissolved in tetrachloroethane and the solution was treated at 0° with sufficient sulfur trioxide-pyridine complex to react with the hydroxyl groups. The sodium salt was then prepared:

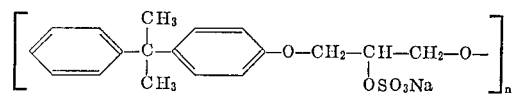

(A) Polypropylene fibers containing 20 percent of the polyether sulfate dyed heavily with basic dyes.

(B) Polyethylene fibers and films containing 10 percent of the polyether sulfate dyed well with basic dyes.

Example XVI

A polyether was made from resorcinol and ethylene dichloride, using the general method described in U.S. Patent No. 2,060,715. It was treated with sulfur trioxide to convert 50–60 percent of the aromatic rings to sulfonic acid structures. The lithium salt was prepared.

(A) Polypropylene fibers and films containing 5 percent of the polyether sulfonate dyed well with basic dyes.

(B) Polyethylene fibers and films containing 8 percent of the polyether sulfonate dyed well with basic dyes.

(C) Poly(4-methylpentene-1) fibers containing 10 percent of the polyether sulfonate dyed well with basic dyes.

POLYAMIDE-ESTERS CONTAINING ACID SULFATE OR SULFONIC GROUPS

Example XVII

Twenty-seven g. (0.10) mole of the lithium salt of 5-sulfoisophthalic acid, 34.4 g. (0.20) mole of decamethylenediamine and 40 cc. of water were stirred at 100° until a clear solution was obtained. The temperature was then raised to 200°-210° while the water was removed through a distillation column. The melt was held at this temperature for 2–3 hours to form the amide of the sulfoisophthalic acid. To the mixture of amide and excess diamine was added 40.4 g. (0.20 mole) of sebacic acid and 11.8 g. (0.10 mole) of hexanediol. The mixture was stirred at 200°-210° for 5 hours while nitrogen was bubbled into the melt. The product was a brittle glass. It was ground to a particle size of 200 mesh.

(A) Ten g. of the poly(amide-ester)sulfonate was mixed with 90 g. of crystallizable polypropylene in a heated Banbury mixer in an atmosphere of nitrogen. The blend was extruded as a 1/8" rod which was cut into 1/8" pellets. The pellets were extruded through a multihole spinneret by the melt-spinning process. After being drafted and heat-set, the fibers dyed well with basic dyes.

(B) Fifteen g. of the poly(amide-ester)sulfonate and 85 g. of polyethylene were blended as described in A above. Fibers and films made from the blend dyed well with basic dyes.

(C) Polystyrene fibers containing 15–20 percent of the poly(amide-ester)sulfonate dyed well with basic dyes.

D) A copolymer of 85 percent propylene-15 percent butylene containing 12 percent of the poly(amide-ester) sulfonate dyed well with basic dyes.

Example XVIII

Two molecular proportions of ethylene glycol, one molecular proportion of hexamethylenediamine and 2.5 molecular proportions of adipic acid were heated and stirred at 180–220° in a flask equipped with a distillation column. Water was removed and the reaction was continued until the acid number was less than 10. The product was a short-chain poly(amide-ester) terminated with hydroxyl groups. Treatment with sulfur trioxide converted the hydroxyl groups to acid sulfate groups. The sodium salt was prepared by neutralization with sodium carbonate.

(A) Polypropylene fibers containing 20 percent of the poly(amide-ester)sulfate dyed well with basic dyes. The polypropylene was the crystallizable type.

(B) Polyethylene fibers and films containing 15 percent of the poly(amide-ester)sulfate dyed well with basic dyes.

(C) A copolymer of 90 percent propylene and 10 percent hexene-1 containing 25 percent of the poly(amide-ester)sulfate dyed to heavy shades with basic dyes.

Example XIX

A poly(amide-ester) was prepared from two moles of monosodium sulfosuccinic acid, one mole of 3,3'-ethylenedioxybis(propylamine) and one mole of 1,4-cyclohexanedimethanol. The product was ground to a particle size of 200-mesh.

(A) Fifteen g. of the poly(amide-ester)sulfonate was added to a solution of 85 g. of crystallizable polypropylene in 400 cc. of xylene at 130°. The mixture was stirred and films were cast on a metal plate heated to 100–110°. When the xylene evaporated, a film of polypropylene containing finely dispersed sulfonate polymer was obtained. The film dyed heavily with basic dyes.

(B) Polyethylene films containing 20 percent of the sulfonate polymer were prepared as described in A. They dyed to deep shades with basic dyes.

(C) Poly(vinylcyclohexane) and poly(allylbenzene) films and fibers containing 12 percent of the sulfonate polymer dyed well with basic dyes.

Reference has been made in the above examples to dyeing the poly-α-olefin compositions of our invention with basic dyes. Suitable basic dyes are: Sevron Blue B (C.I. No. Basic Blue 21), Sevron Brilliant Red 4G (C.I. No. Basic Red 14), Sevron Green B (C.I. No. Basic Green 3), Sevron Yellow L (C.I. No. Basic Yellow 13), Auramine SP (C.I. No. Basic Yellow 2), Calcozine Orange RS (C.I. No. Basic Orange 1), Rhodamine 5G (C.I. No. Basic Red 1), Bismarck Brown (C.I. No. Basic Brown 4) and Methyl Violet (C.I. No. Basic Violet 1).

The utility of our invention speaks for itself inasmuch as it provides a means of solving one of the most difficult and long standing problems in the manufacture of commercially acceptable poly-α-olefin filaments, fibers, films and other products, namely, the permanent and satisfactory dyeing of such material with basic dyes by the dyeing procedure commonly employed in the textile industry. Specifically our invention provides a means of obtaining deep and permanent shades in polypropylene and other poly-α-olefin yarns and fibers which are light fast, gas fast and wash fast.

Although the invention has been described in considerable detail with particular reference to certain preferred embodiments thereof, variations and modifications can be effected within the spirit and scope of the invention as described hereinabove, and as defined in the appended claims.

I claim:

1. A polyolefin fiber- and film-forming composition susceptible of permanent dyeing by basic dyes which comprises a poly-alpha-olefin containing distributed therein as a dye receptor a condensation polymer containing in its molecule from 0.4 to 6 percent of sulfur in the form of an acidic group selected from the class consisting of sulfonic acid and acid sulfate groups, said condensation polymer being a polyether composed of linear chains of monomer units derived from at least one bifunctional compound having two functional hydroxy substituents, said monomer units being linked end to end in linear chains by means of ether linkages.

2. A polyolefin fiber- and film-forming composition susceptible of permanent dyeing by basic dyes which comprises a poly-alpha-olefin containing distributed therein as a dye receptor 1–25 percent, based on the weight of the total composition, of a condensation polymer containing in its molecule from 0.4 to 6 percent of sulfur in the form of an acidic group selected from the class consisting of sulfonic acid and acid sulfate groups, said condensation polymer being a polyether composed of linear chains of monomeric units derived from at least one bifunctional compound having two functional hydroxy substituents, said monomer units being linked end to end in linear chains by means of ether linkages.

3. A polyolefin fiber- and film-forming composition, susceptible of permanent dyeing by basic dyes which comprises a poly-alpha-olefin containing distributed therein as a dye receptor 1–25 percent, based on the weight of the total composition, of a condensation polymer containing in its molecule from 0.8 to 3.0 percent of sulfur in the form of an acidic group selected from the class consisting of sulfonic acid and acid sulfate groups, said condensation polymer being a polyether composed of linear chains of monomeric units derived from at least one bifunctional compound having two functional hydroxy substituents, said monomer units being linked end to end in linear chains by means of ether linkages.

4. The composition of claim 1 in which the poly-α-olefin is polypropylene.

5. The composition of claim 2 in which the poly-α-olefin is polypropylene.

6. The composition of claim 3 in which the poly-α-olefin is polypropylene.

7. A fiber of the composition of claim 1.
8. A fiber of the composition of claim 2.
9. A fiber of the composition of claim 3.
10. A fiber of the composition of claim 4.
11. A fiber of the composition of claim 5.
12. A fiber of the composition of claim 6.

References Cited

UNITED STATES PATENTS

| | | | |
|---|---|---|---|
| 3,228,484 | 6/1967 | Lagaz et al. | 260—857 |
| 3,107,228 | 10/1963 | Cappuccio | 260—857 |
| 3,039,990 | 6/1962 | Huffman | 260—857 |
| 3,161,608 | 12/1964 | Caldwell | 260—857 |
| 3,235,623 | 2/1966 | Hacquard | 260—857 |
| 3,256,363 | 6/1966 | Horn | 260—873 |

FOREIGN PATENTS

| | | |
|---|---|---|
| 1,284,623 | 2/1961 | France. |
| 1,143,591 | 2/1963 | Germany. |
| 1,363,166 | 5/1964 | France. |

MURRAY TILLMAN, *Primary Examiner.*

P. LIEBERMAN, *Assistant Examiner.*